(12) United States Patent
Chen et al.

(10) Patent No.: US 11,537,858 B2
(45) Date of Patent: Dec. 27, 2022

(54) COMPUTING DEVICE AND METHOD

(71) Applicant: Shanghai Cambricon Information Technology Co., Ltd., Pudong New Area (CN)

(72) Inventors: Tianshi Chen, Pudong New Area (CN); Xuda Zhou, Pudong New Area (CN); Shaoli Liu, Pudong New Area (CN); Zidong Du, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 524 days.

(21) Appl. No.: 16/698,988

(22) Filed: Nov. 28, 2019

(65) Prior Publication Data
US 2020/0110609 A1    Apr. 9, 2020

Related U.S. Application Data

(63) Continuation of application No. 16/698,976, filed on Nov. 28, 2019, which is a continuation-in-part of (Continued)

(30) Foreign Application Priority Data
Jun. 22, 2017   (CN) .......................... 201710483182.6

(51) Int. Cl.
*G06N 3/063* (2006.01)
*G06F 9/30* (2018.01)
(Continued)

(52) U.S. Cl.
CPC .......... *G06N 3/063* (2013.01); *G06F 9/3001* (2013.01); *G06F 9/30094* (2013.01);
(Continued)

(58) Field of Classification Search
CPC .......... G06N 3/04; G06N 3/063; G06V 10/82
See application file for complete search history.

(56) References Cited

U.S. PATENT DOCUMENTS

2011/0239032 A1* 9/2011 Kato .................. G06F 17/15
713/500
2016/0117587 A1* 4/2016 Yan .................. G06N 3/0454
706/20

FOREIGN PATENT DOCUMENTS

CN         1838031 A      9/2006
CN       101854526 A     10/2010
(Continued)

OTHER PUBLICATIONS

CN 201710441977.0—Second Office Action, dated Sep. 15, 2020, 9 pages.
(Continued)

*Primary Examiner* — Michael J Metzger
(74) *Attorney, Agent, or Firm* — Getech Law LLC; Jun Ye

(57) ABSTRACT

A computing device, comprising: a computing module, comprising one or more computing units; and a control module, comprising a computing control unit, and used for controlling shutdown of the computing unit of the computing module according to a determining condition. Also provided is a computing method. The computing device and method have the advantages of low power consumption and high flexibility, and can be combined with the upgrading mode of software, thereby further increasing the computing speed, reducing the computing amount, and reducing the computing power consumption of an accelerator.

15 Claims, 1 Drawing Sheet

Related U.S. Application Data application No. PCT/CN2018/090901, filed on Jun. 12, 2018.

(51) Int. Cl.
  *G06N 3/04* (2006.01)
  *G06N 3/02* (2006.01)
  *G06V 10/70* (2022.01)

(52) U.S. Cl.
  CPC .......... *G06F 9/30145* (2013.01); *G06N 3/02* (2013.01); *G06N 3/04* (2013.01); *G06V 10/70* (2022.01)

(56) References Cited

FOREIGN PATENT DOCUMENTS

| | | |
|---|---|---|
| CN | 104539263 A | 4/2015 |
| CN | 105320495 A | 2/2016 |
| CN | 105512723 A | 4/2016 |
| CN | 106779068 A | 5/2017 |
| CN | 106796668 A | 5/2017 |
| CN | 109086880 A | 12/2018 |

OTHER PUBLICATIONS

CN 201710473955.2—First Office Action, dated Mar. 2, 2020, 3 pages. (No English Translation).
CN 201710473955.2—Second Office Action, dated May 15, 2020, 3 pages. (No English Translation).
CN 201710473955.2—Third Office Action, dated Aug. 24, 2020, 4 pages. (No English Translation).
CN 201710474297.9—First Office Action, dated May 15, 2020, 3 pages, (No English Translation).
CN 201710474297.9—Second Office Action, dated Nov. 12, 2020, 9 pages, (No English Translation).
CN 201710483182.6—First Office Action, dated Apr. 29, 2020, 9 pages, (No English Translation).
CN 201710495795.1—First Office Action, dated Dec. 30, 2019, 3 pages, (No English Translation).
CN 201710495795.1—Second Office Action, dated Mar. 25, 2020, 4 pages, (No English Translation).
PCT/CN2018/090901—International Search Report, dated Aug. 27, 2018, 10 pages, (No English translation).
EP 18818258.8—Response to the Invitation to File a Copy of Search Results Pursuant to Rule 70b(1) EPC dated Feb. 4, 2021, filed Feb. 18, 2021, 8 pages.
EP 18818258.8—Extended European Search Report, dated Jul. 21, 2020, 9 pages.
EP 18818258.8—Response to Extended European Search Report dated Jul. 21, 2020, dated Jan. 26, 2021, 14 pages.
Zhang, et al., "Power Optimization in Multipliers Using Multi-Precision Combined with Voltage Scaling Techniques", IEEE 1st Int'l Symposium on Quality Electronic Design—Asia, 2009, 4 pages.
Fayed, et al., "A Novel Architecture for Low-Power Design of Parallel Multipliers", Proceedings IEEE Computer Society Workshop on VLSI 2001. Emerging Technologies for VLSI Systems, 2001, pp. 149-154.
EP 19217768.1—Response to Extended European Search Report dated Apr. 24, 2020, dated Nov. 25, 2020, 11 pages.
EP 19217768.1—Response to Extended European Search Report dated Dec. 3, 2020, dated Jan. 29, 2021 3 pages.
CN 201710441977.0, Official Action dated Apr. 7, 2020, 8 pages.
Shijin Zhang, et al. "Cambricon-X: An Accelerator for Sparse Neural Networks"; 49th Annual IEEE/ACM International Symposium on Microarchitecture; University of Chinese Academy of Sciences, Beijing, China; Dec. 15, 2016, 12 pages.
EP19217768.1, European Search Report dated Apr. 24, 2020, 9 pages.
Alham Fikriaji et al., "Sparse Communication for Distributed Gradient Descent", arxiv.org, Cornell University Library, 201 Olin Library Cornell University Ithaca, NY 14853, Apr. 17, 2017, 6 pages.
Wei Wen et al., "TernGrad: Ternary Gradients to Reduce Communication in Distributed Deep Learning", arxiv.org, Cornell University Library, 201 Olin Library Cornell University Ithaca, NY 14853, May 22, 2017, 13 pages.
PCT/CN2018/090901—Search Report, dated Aug. 21, 2018, 9 pages.

\* cited by examiner

COMPUTING DEVICE AND METHOD

TECHNICAL FIELD

The disclosure relates to the fields of computer architecture and neural network, and specifically relates to a processor, a processing method of the processor, a chip, a chip package structure, and an electronic device.

BACKGROUND

In recent years, neural networks have achieved outstanding achievements not only in the field of image application, but also in the field of video application. However, neural networks face a very serious challenge in the video application field, which is due to the fact that the amount of data contained in a video far exceeds the amount of data contained in a single image. In this situation, it may take a large amount of time for processing a video and may cost huge energy consumption. However, there is no guarantee that the video data can be processed in real time. Therefore, how to reduce the time for the neural network to process videos has become an urgent problem to be solved.

SUMMARY

In view of the problems above, a main purpose of the present disclosure is to provide a processor, a processing method of the processor, a chip, a chip package structure, and an electronic device to solve at least one of the problems above.

The present disclosure provides a processor, where the processor may include an instruction control unit and an operation module, where:

the instruction control unit may be configured to fetch a processing instruction and transfer the processing instruction to the operation module; and the operation module may be configured to receive frame information, neural network parameters, and the processing instruction, and perform neural network operations on the frame information and the neural network parameters according to the processing instruction.

In an example of the disclosure, the processor may further include:

a storage module configured to store the frame information and the neural network parameters, where the frame information may include complete frame information and reference frame information; and the neural network parameters may include neurons, weights, topological structures and/or processing instructions.

In an example of the disclosure, the operation module may include:

an accurate operation unit configured to fetch the complete frame information and weights in the neural network parameters, perform neural network operations to obtain a first operation result, and transfer the first operation result to the storage module; and an approximate operation unit configured to fetch the reference frame information and an operation result of the reference frame which may be obtained in advanced and stored in the storage module, then perform approximate operations to obtain a second operation result and transfer the second operation result to the storage module.

In an example of the disclosure, the neural network operations may include multiplication operations, addition operations, activation function operations, and/or pooling operations.

In an example of the disclosure, the accurate operation unit may include: a multiplier configured to perform the multiplication operations; and/or one or more adders configured to perform the addition operations; and/or an activation function unit configured to perform the activation function operations.

In an example of the disclosure, the adder tree may be consisted of one or more adders.

In an example of the disclosure, activation functions employed by the activation function operations may include sigmoid, tan h, ReLU, softmax, Leaky ReLU, and/or Maxout; the pooling operations may include mean-pooling, max-pooling, median-pooling, RoIpooling, and/or reverse pooling.

In an example of the disclosure, the processor may further include:

a decoding module configured to decompress a compressed video, fetch frame information from each frame in the video, then divide the frame information into complete frame information and reference frame information, and store the complete frame information and the reference frame information in the storage module.

In an example of the disclosure, the reference frame information may include reference frame information that refers to encoding of a previous frame and/or reference frame information that refers to encodings of a previous frame and a subsequent frame.

In an example of the disclosure, the decoding module may further be configured to assign a flag bit to each piece of frame information, where the complete frame information may be marked as I frame, the reference frame information that refers to encoding of a previous frame may be marked as P frame, and the reference frame information that refers to encodings of a previous frame and a subsequent frame may be marked as B frame.

In an alternative example:

for reference frame information that refers to the encoding of a previous frame, the decoding module may further be configured to mark a previous reference frame of the frame and/or displacement of the frame compared with the previous reference frame; and for reference frame information that refers to the encodings of a previous and a subsequent frames, the decoding module may further be configured to mark the previous reference frame and the subsequent reference frame of the frame and/or displacements of the frame compared with the previous and subsequent reference frames.

As an alternative example, the processor may further include:

a decoding module connected to the instruction control unit and the operation module for decoding processing instructions and transferring the decoded processing instructions to the operation module. Then the operation module may perform neural network operations on frame information and neural network parameters according to the decoded processing instructions.

In order to realize the above-mentioned purpose, the present disclosure provides a processing method of the processor, which may include the following:

Step 1: fetching a processing instruction by the instruction control unit to control the operation module; and Step 2: receiving, by the operation module, frame information, neural network parameters, and the processing instruction, and performing neural network operations on the frame information and the neural network parameters according to the processing instruction.

As an alternative example, the frame information and neural network parameters may be stored in a storage module, where the frame information may include complete frame information and reference frame information, and the neural network parameters may include neurons, weights, topological structures and/or processing instructions.

As an alternative example, the operation module of the processor may include: an accurate operation unit and an approximate operation unit. The Step 2 may specifically include the following:

fetching, by the accurate operation unit, complete frame information and weights in the neural network parameters, performing neural network operations to obtain a first operation result and transferring the first operation result to the storage module; and fetching, by the approximate operation unit, reference frame information and the operation result of the reference frame which is obtained in advanced and stored in the storage module, then performing approximate operations to obtain a second operation result and transferring the second operation result to the storage module As an alternative example, the neural network operations may include multiplication, addition, activation function operations and/or pooling operations.

As an alternative example, the accurate operation unit of the operation module may include:

a multiplier configured to perform the multiplication; and/or one or more adders configured to perform the addition; and/or an activation function unit configured to perform the activation function operations.

Alternatively, the one or more adders may form an adder tree.

As an alternative example, the activation functions employed by the activation function operations may include sigmoid, tan h, ReLU, softmax, Leaky ReLU and/or Maxout; the pooling operations may include mean-pooling, max-pooling, median-pooling, RoI pooling and/or reverse pooling.

As an alternative example, prior to the Step 1, the method may further include:

decompressing, by the decoding module, compressed videos, fetching frame information from each video frame, then dividing the frame information into complete frame information and reference frame information, and storing the complete frame information and the reference frame information in the storage module.

As an alternative example, the reference frame information may include reference frame information that refers to encoding of a previous frame and/or reference frame information that refers to encodings of a previous frame and a subsequent frame.

As an alternative example, the decoding module is further configured to assign a flag bit to each piece of frame information, where complete frame information is marked as I frame, reference frame information that refers to encoding of a previous frame is marked as P frame, reference frame information that refers to encodings of a previous frame and a subsequent frame is marked as B frame.

As an alternative example:

when reference information is reference frame information that refers to encoding of a previous frame, the decoding module may further be configured to mark the previous reference frame of the frame and/or displacement of the frame compared with the previous reference frame;

when reference information is reference frame information that refers to encodings of a previous frame and a subsequent frame, the decoding module may further be configured to mark the previous reference frame and the subsequent reference frame of the frame and/or displacements of the frame compared with the previous reference frame and the subsequent reference frame.

As an alternative example, between the Step 1 and Step 2, the method may further include:

encoding, by the encoding module which is connected to the instruction control unit and the operation module, the processing instruction and transferring the encoded processing instruction to the operation module; then performing, by the operation module, neural network operations on the frame information and the neural network parameters according to the encoded processing instruction.

An example of the present disclosure provides a chip including the processor provided.

An example of the present disclosure further provides a chip package structure including the chip.

Another example of the present disclosure provides a board card including the chip package structure.

Another example of the present disclosure provides an electronic device including the board card.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance, and/or a medical facility.

The vehicle may include an airplane, a ship, and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

The processor and data processing method described above may have the following technical effects:

(1) the processor of the disclosure may divide information of each frame in a video into complete frame information and reference frame information, and then perform accurate operations on the complete frame information (e.g., neural network operations), approximate operations on the reference frame information and an operation result of the reference frame obtained in advance. Thus, when a neural network processes a video, the quantity of operations performed by the neural network may thus be greatly decreased, the operation time may be reduced, and the power consumption may be cut down.

(2) the processor of the disclosure may efficiently rebuild the function of a neural network processor and greatly reduce the time spent on videos processing, thus, video data may be processed in real-time.

(3) the processor of the disclosure may be capable of fulfilling its function in an application environment with features of low memory and strong real-timeness, video processing may thus be further simplified and accelerated.

DETAILED DESCRIPTION

Figure 1:
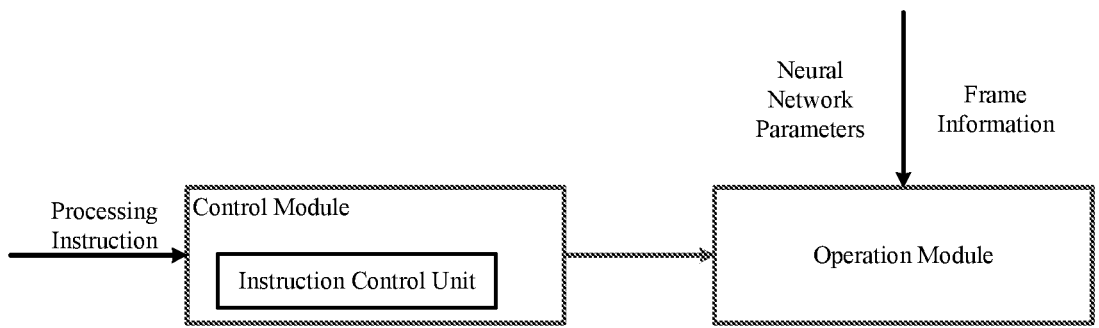
FIG. 1 is a structural diagram of a processor in an example of the disclosure.

The present disclosure is explained more fully hereinafter with reference to specific examples and the accompanying drawings to facilitate a better understanding of the purposes, technical schemes and advantages of the disclosure.

It should be noted that in the description of the drawings or the specification, reference is made to the drawings, and the same reference numbers used designate the same or similar parts. The implementations that are not illustrated or described in the drawings are well-known to persons having ordinary skill in the art of the disclosure. Also, it should further be noted that, though instances including the parameters of specific values are provided herein, the parameters need not exactly equal the corresponding values. Instead, the parameters may approximates the corresponding values within an acceptable error tolerance or a design constraint. In addition, the location words used in the examples hereinafter, such as "up", "down", "front", "back", "left", "right", and the like, merely indicate the location in the reference drawings. Thereby, the location words used are not intended to limit the disclosure.

Unless otherwise defined, all technical and scientific terms used herein have the same meaning as commonly understood by persons having ordinary skill in the art of the disclosure. The terms used in the specification of the disclosure are merely for the purpose of describing specific examples and are not intended to limit the disclosure. The phrase "and/or" used herein refers to the random and all combinations of one or a plurality of related items listed.

FIG. 1 is a structural diagram of a processor provided in an example of the disclosure. The processor may include a control module and an operation module, where an instruction control unit of the control module may be configured to fetch processing instructions to control the operation module, and the operation module may be configured to receive frame information, neural network parameters, the processing instructions, and may be configured to perform neural network operations on the frame information and the neural network parameters according to the processing instructions.

As an alternative example, the processor may further include: a storage module configured to store frame information and neural network parameters, where the frame information may include complete frame information and reference frame information, and the neural network parameters may include neurons, weights, topological structures and/or processing instructions.

As an alternative example, the operation module of the processor may include: an accurate operation unit configured to fetch complete frame information and weights in the neural network parameters, perform neural network operations to obtain a first operation result and transfer the first operation result to the storage module; an approximate operation unit configured to fetch reference frame information and the operation result of the reference frame which is obtained in advanced and stored in the storage module, then perform approximate operations to obtain a second operation result and transfer the second operation result to the storage module. Alternatively, the neural network operations performed by the operation module may include multiplication, addition, activation function operations and/or pooling operations.

As an alternative example, the accurate operation unit of the operation module may include: a multiplier configured to perform the multiplication; and/or one or more adders configured to perform the addition; and/or an activation function unit configured to perform the activation function operations. Alternatively, the one or more adders may form an adder tree.

As an alternative example, the activation functions employed by the activation function operations may include sigmoid, tan h, ReLU, softmax, Leaky ReLU and/or Maxout; the pooling operations may include mean-pooling, max-pooling, median-pooling, RoI pooling and/or reverse pooling.

As an alternative example, the processor may further include: a decoding module configured to decompress compressed videos, fetch frame information from each video frame, then divide the frame information into complete frame information and reference frame information, and store the complete frame information and the reference frame information in the storage module.

As an alternative example, the reference frame information may include reference frame information that refers to encoding of a previous frame and/or reference frame information that refers to encodings of a previous frame and a subsequent frame.

As an alternative example, the decoding module is further configured to assign a flag bit to each piece of frame information, where complete frame information is marked as I frame, reference frame information that refers to encoding of a previous frame is marked as P frame, reference frame information that refers to encodings of a previous frame and a subsequent frame is marked as B frame.

As an alternative example, when reference information is reference frame information that refers to encoding of a previous frame, the decoding module may further be configured to mark the previous reference frame of the frame and/or displacement of the frame compared with the previous reference frame; when reference information is reference frame information that refers to encodings of a previous frame and a subsequent frame, the decoding module may further be configured to mark the previous reference frame and the subsequent reference frame of the frame and/or displacements of the frame compared with the previous reference frame and the subsequent reference frame.

As an alternative example, the processor may further include: an encoding module that may be connected to the instruction control unit of the control module and the operation module, and may be configured to encode the processing instruction and transfer the encoded processing instruction to the operation module, where the operation module may then perform neural network operations on the frame information and the neural network parameters according to the encoded processing instruction.

Figure 2:
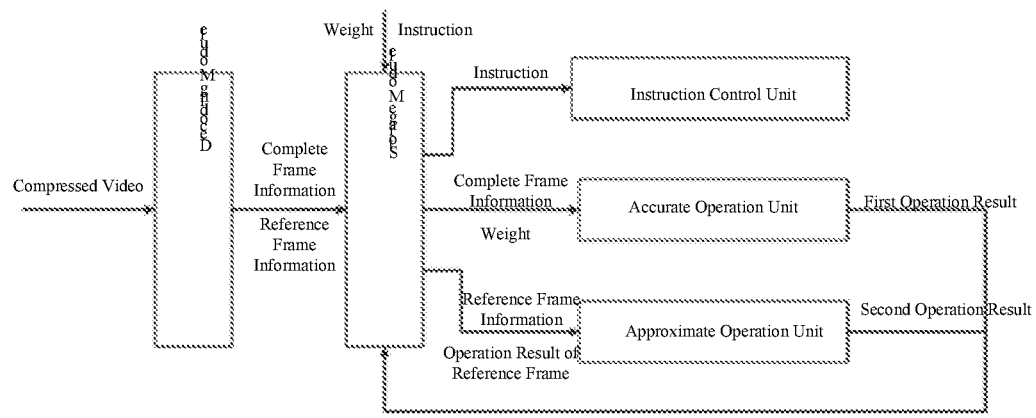
FIG. 2 is a structural diagram of a processor in another example of the disclosure.

An example of the present disclosure provides a processor. FIG. 2 shows a structure of the processor. The processor may include a storage module, a control module, an accurate operation unit, and an approximate operation unit, where:

the storage module may be configured to store complete frame information, reference frame information, and neural network parameters; the neural network parameters may include neurons, weights, topological structures, and processing instructions; the instruction control unit of the control module may be configured to fetch processing instructions and decode the processing instructions to control the accurate operation unit and the approximate operation unit; the accurate operation unit may be configured to fetch complete frame information and weights to perform neural network operations to obtain a first operation result, then transfer the first operation result to the storage module for storing; the approximate operation unit may be configured to fetch reference frame information and the operation result of reference frame pre-stored in the storage module to perform approximate operations to obtain a second operation result, and transfer the second operation result to store the storage module.

Alternatively, the accurate operation unit may perform neural network operations according to complete frame information and weights of a frame marked as I frame to obtain a first result, and transfer the first result to the storage module for storing, so that the first result may be used as an operation reference of the approximate operation unit and part of a result obtained by the whole processor.

Alternatively, the accurate operation unit may include, but is not limited to, three sections. A first section may include one or more multipliers; a second section may include one or more adders, and optionally, the second section may include one or more adders where the adders may form an adder tree; a third section is an activation function unit. The first section may multiply input data 1 (in1) by input data 2 (in2) to obtain an output (out), and the process is as follows: out=in1*in2. The second section may add in1 level by level in an adder tree to obtain output data (out), where in1 is a vector with a length of N, N is greater than 1, and the process is as follows: out=in1[1]+in1[2]+ . . . +in1[N]; and/or the second section may accumulate input data (in1) through the adder tree, then add the accumulation result and input data (in2) to obtain output data (out), and the process is as follows: out=in1[1]+in1[2]+ . . . +in1[N]+in2; or the second section may add input data (in1) and input data (in2) to obtain output data (out), and the process is as follows: out=in1+in2. The third section may perform activation function (active) operations on input data (in) to obtain an activated output data (out), and the process is as follow: out=active(in), where the activation function (active) may be sigmoid, tan h, ReLU, softmax, and the like. In addition to activation operations, the third section may also be capable of realizing other non-linear functions. The third section can perform operations (f) on input data (in) to obtain output data (out), the process is as follows: out=f(in).

Alternatively, the accurate operation unit may also include a pooling unit. The pooling unit may perform pooling operations on input data (in) to obtain output data (out) after being pooled, and the process is as follows: out=pool(in), where pool represents a pooling operation. The pooling operation may include, but is not limited to mean-pooling, max-pooling, median-pooling. As mentioned above, input data (in) is the data in a pooling kernel related to output data (out).

As an alternative example, the accurate operation unit may include several sections. A first section may multiply input data 1 by input data 2 to obtain a result; a second section may perform adder tree operations where input data 1 may be added level by level in the adder tree, or input data 1 may be added to input data 2 to obtain a result; a third section may perform activation function operations, where the third section may perform activation function (active) operations on input data to obtain output data. Operations performed by the above-mentioned sections may be freely combined to achieve operations of different functions.

Alternatively, the approximate operation unit may fetch reference frame information marked as P frame and/or B frame, displacement information, and a pre-obtained operation result of a marked previous reference frame and/or marked previous and subsequent reference frames. The approximate operation unit may output a second operation result through a behavior prediction approximate operation, then transfer the second operation result to the storage module as another part of the result obtained by the whole processor. The pre-obtained operation result of the previous reference frame and/or the previous and subsequent reference frames may be a first operation result or a second operation result.

The processor provided in the present disclosure may be used for high-speed video processing by using a neural network. The processor may be capable of fetching all frames from a video as well as behavior prediction information of each frame, using an operation module that corresponds to the type of a frame and behavior prediction information to perform operations, and for some of the frames, performing approximate operations to reduce an amount of operations so that the time and power consumption for video processing may be decreased.

Figure 3:
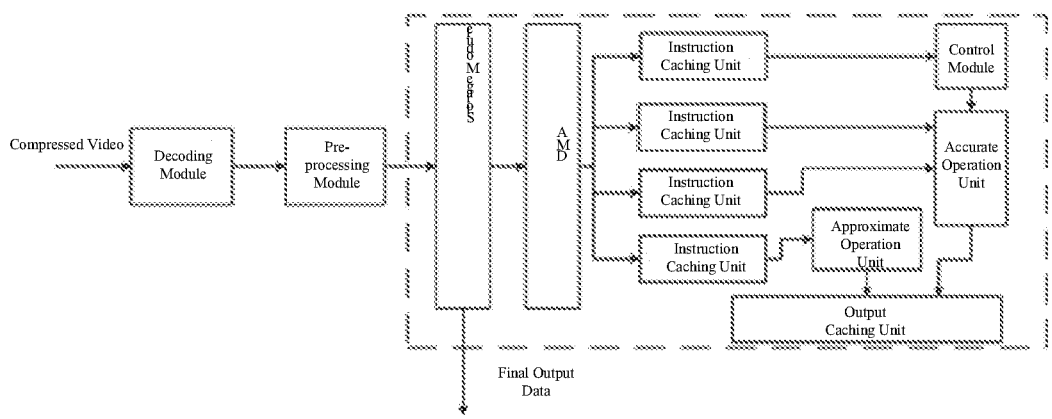
FIG. 3 is a structural diagram of a processor in an example of the disclosure.

Another example of the present disclosure provides a processor as shown in FIG. 3. The processor may include a decoding module, a storage module, a control module, an operation module, where the operation module may include: an accurate operation unit and an approximate operation unit; the control module may include an instruction control unit.

The decoding module may be configured to decompress videos, fetch the type and behavior prediction information of each of the frames from a video and transfer to the storage module. The storage module may be configured to store complete frame information, reference frame information, and neural network parameters. The neural network parameters may include neurons, weights, topological structures, and processing instructions.

The instruction control unit may receive instructions stored in the storage module, decode and generate control information to control the accurate operation unit and the approximate operation unit to perform operations.

The accurate operation unit may receive complete frame information and neural network weights, perform neural network operations to obtain a first operation result and transfer the first operation result to the storage module.

The approximate operation unit may receive reference frame information, displacement information, and a pre-obtained operation result of a reference frame, perform a behavior prediction approximate operation to obtain a second operation result, then transfer the second operation result to the storage module. The pre-obtained operation result of a reference frame may be the first operation result or the second operation result.

The processor further may include a pre-processing module which is located between the decoding module and the storage module. The pre-processing module may be configured to pre-process raw data, where the pre-processing may include partition, Gaussian filter, binarization, regularization, normalization, and the like.

The processor may also include an instruction caching unit, a complete frame caching unit, a weight caching unit, a reference frame caching unit, an output operation result caching unit, and may further include a weight address caching unit (not shown in the figure). The instruction caching unit may be configured to store dedicated instructions; the complete frame caching unit may be configured to store complete frame information; the weight caching unit may be configured to store neural network weight data; the reference frame caching unit may be configured to store reference frame information, where the reference frame information may include reference frame information of P frame and/or B frame, displacement information and a pre-obtained operation result of a marked previous reference frame and/or marked previous and subsequent reference frames; the output operation result caching unit may be configured to store output of an operation unit, where the output may include a first operation result and a second operation result.

The processor may further include DMA (Direct Memory Access). DMA may be configured to read and write data or instructions between the storage module, the instruction caching unit, the weight caching unit, the complete frame caching unit, the reference frame caching unit, and the output operation result caching unit.

It should be noted that in the processor provided in the present example, the components except for the decoding module and the pre-processing module may be integrated as an artificial neural network operation module, and may be further integrated into an artificial neural network chip.

All the units of the processor provided in the present example may be implemented in hardware, where a physical implementation of the hardware may include, but is not limited to a physical component. The physical component may include, but are not limited to a transistor, a memristor and, a DNA computer.

An example of the disclosure further provides a method for processing data using the processor of the above-mentioned example, and the method may include the following steps:

Step C: fetching a processing instruction by the instruction control unit to control the operation module.

Specifically, the instruction control unit may fetch a processing instruction stored in the storage module, and decode the processing instruction to control the accurate operation unit and the approximate operation unit.

Step D: receiving, by the operation module, frame information, neural network parameters and the processing instruction, and performing neural network operations on the frame information and the neural network parameters according to the processing instruction.

Specifically, the accurate operation unit of the operation module may fetch complete frame information and weights, perform neural network operations to obtain a first operation result, then transfer the first operation result to the storage module for storing. The approximate operation unit of the operation module may fetch reference frame information and a pre-obtained operation result of a reference frame, perform approximate operations to obtain a second operation result, and transfer the second operation result to the storage module for storing.

As an alternative example, prior to the Step C, the method may further include:

decompressing a compressed video by the decoding module, fetching frame information of each frame of the video, dividing the frame information into complete frame information and reference frame information, and transferring the complete frame information and the reference frame information to the storage module for storing.

Alternatively, the neural network operation may include multiplication, addition, activation function operations, and/or pooling operations. Alternatively, the accurate operation unit may include: a multiplier configured to perform multiplication, and/or one or more adders configured to perform addition, and/or an activation function unit configured to perform activation function operations. Alternatively, the one or more adders may form an adder tree.

As an alternative example, the activation functions employed by the activation function operation may include sigmoid, tan h, ReLU, softmax, Leaky ReLU, and/or Maxout; the pooling operations may include mean-pooling, max-pooling, median-pooling, RoI pooling, and/or reverse pooling.

As an alternative example, the reference frame information may include the reference frame information that refers to the encoding of a previous frame and/or the reference frame information that refers to the encodings of a previous frame and a subsequent frame.

As an alternative example, the decoding module may further be configured to assign a flag bit to each piece of frame information, where complete frame information may be marked as I frame, reference frame information that refers to encoding of a previous frame may be marked as P frame, reference frame information that refers to encodings of a previous frame and a subsequent frame may be marked as B frame.

As an alternative example, for reference frame information that refers to the encoding of a previous frame, the decoding module may further be configured to mark the previous reference frame of the frame and/or displacement of the frame compared with the previous reference frame; for reference frame information that refers to the encodings of a previous and a subsequent frames, the decoding module may further be configured to mark the previous reference frame and the subsequent reference frame of the frame and/or displacements of the frame compared with the previous and subsequent reference frames.

As an alternative example, the decoding module which is located between the instruction control unit and the operation module, may be capable of decoding processing instructions and transferring the decoded processing instructions to the operation module. Then the operation module may perform neural network operations on frame information and neural network parameters according to the decoded processing instructions.

The processor provided in the example above may include a video decoding module, a storage module, an instruction control unit, an accurate operation unit, and an approximate operation unit, where neural network parameters including processing instructions and weights are pre-stored in the storage module. The method of using the processor to process data may include the following steps: S1: decompressing a compressed video, by the video decoding module, fetching frame information of each frame of the video, and dividing frame information into complete frame information and reference frame information.

S2: storing, by the storage module, the complete frame information and the reference frame information divided by the video decoding module.

S3: fetching, by the instruction control unit, a processing instruction from the storage module, and decoding the processing instruction to control the accurate operation unit and the approximate operation unit.

S4: fetching, by the accurate operation unit, the complete frame information and a weight to perform neural network operations, obtaining a first operation result and transferring the first operation result to the storage module.

S5: fetching, by the approximate operation unit, the reference frame information and an operation result of a reference frame to perform approximate operations, obtaining a second operation result and transferring the second operation result to the storage module.

S6: storing, by the storage module, the first and the second operation results, and finishing the video processing.

In an example, the processor may be applied to an accelerated device for accelerating object recognition in a video. Detailed steps may include:

First, fetching, by the decoding module, frame information of each frame of a video while decompressing the video, and dividing the frame information into three types: I frame (complete encoded frame information), P frame (frame information generated by referring previous I frame and only includes encoding of differences), and B frame (frame information referring encodings of a previous and a subsequent frames)

Then, the decoding module may assign a flag bit to each piece of frame information of the video to mark a frame type. For P frame, the decoding module may also mark a previous reference frame of the P frame, and for B frame, the decoding module may also mark a previous reference frame and a subsequent reference frame of the B frame.

The decoding module may be configured to transfer marked I frames, P frames, B frames to the storage module for storing.

The storage module may further be configured to store neurons (in other words, each frame), weights, instructions, and frame information (in other words, information of I frame, information of P frame, a marked previous reference frame of P frame, a displacement of P frame compared with the previous reference frame, information of B frame, marked previous and subsequent reference frames of B frame, and displacements of B frame compared with the previous and subsequent reference frames) of a neural network.

The instruction control unit may receive the instructions stored in the storage module, decode the instructions to generate control information, and control the accurate operation unit and the approximate operation unit to perform operations.

The accurate operation unit may fetch the information of I frame and the weights, complete the neural network operation, output neurons, and transfer the neurons to the storage module.

The approximate operation unit may fetch the information of P frame and an operation result of a previous reference frame obtained by the accurate operation unit, and directly output the operation result of the previous reference frame without performing any operation; the approximate operation unit may fetch frame information of B frame and a pre-obtained operation result of marked previous and subsequent reference frames, output the geometric mean (or the arithmetic mean) of the operation result of the previous and subsequent reference frames, and transfer the output result to the storage module.

If the processor provided in the example above includes a decoding module, a storage module, an instruction control unit, an accurate operation unit, and an approximate operation unit, the processor may be implemented in:

an accelerated device configured to accelerate objects in videos. A detailed process is as follows:

First, fetching, by the decoding module, frame information of each frame of a video while decompressing the video. The frame information of the video may be divided into three types: I frame (complete encoded frame information), P frame (frame information generated by referring previous I frame and only includes encoding of differences) and B frame (frame information referring encodings of a previous and a subsequent frames).

Assigning, by the decoding module, a flag bit to each piece of frame information to mark a frame type. For P frame, the decoding module may further be configured to mark a previous reference frame of the P frame and fetch a predicted displacement of an object in the P frame compared with the reference frame; for B frame, the decoding module may be configured to mark a previous reference frame and a subsequent reference frame of the B frame, and fetch a predicted displacement of an object in the B frame compared with the previous reference frame and a predicted displacement compared with the subsequent reference frame.

Transferring, by the decoding module, marked I frame, P frame, the displacement of the P frame compared with the previous frame, B frame, the displacements of the B frame compared with the previous and subsequent reference frames to the storage module.

Further, storing, by the storage module, neurons (in other words, each frame), weights, instructions, and frame information (in other words, frame information of I frame; frame information of P frame, marked previous reference frame of P frame, the displacement of P frame compared with the previous reference frame, frame information of B frame, marked previous and subsequent reference frames of B frame, and the displacement of B frame compared with the previous and subsequent reference frames) of a neural network.

Receiving, by the instruction control unit, the instructions stored in the storage module, decoding the instructions to generate control information, and controlling the accurate operation unit and the approximate operation unit to perform operations.

Fetching, by the accurate operation unit, the information of I frame and the weights, performing the neural network operation to output neurons, and transferring the neurons to the storage module.

Fetching, by the approximate operation unit, P frame, an operation result of a previous reference frame of the P frame, and the displacement of the P frame compared with the previous reference frame, adding the pre-obtained operation result of the marked previous reference frame and the displacement, then outputting the sum. The approximate operation unit may further receive the B frame, pre-obtained operation results of the marked previous reference frame and marked subsequent reference frames, and the displacements of the B frame compared with the previous and subsequent reference frames, then add the geometric mean (or the arithmetic mean) of the operation results of the previous and subsequent reference frames and the geometric mean of the displacements of the frame B compared with the previous and subsequent reference frames, and finally transferring output neurons to the storage module.

Based on the above-mentioned processor, the present example further provides an accelerating device which may include: a memory where executable instructions are stored in the memory; and a processor which may be configured to execute the executable instructions stored in the memory, and when the processor executes the executable instructions, the processor perform operation by following the above-mentioned operation method.

The processor may be a single processing unit, but may also include two or more processing units. Additionally, the processor may also include a general-purpose microprocessor, an instruction set processor, and/or a related chipset and/or a special-purpose microprocessor (e.g., an application specific integrated circuit). The processor may also include an on-chip memory for a caching purpose (in other words, including a memory in a processing device).

All the units of the processor provided in the present disclosure may be implemented in hardware, where a physical implementation of the hardware may include, but is not limited to a physical component. The physical component may include, but are not limited to a transistor, a memristor, and a DNA computer.

An example of the present disclosure provides a chip including the processor provided in the above-mentioned example.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance, and/or a medical facility.

The vehicle may include an airplane, a ship, and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

In the several examples provided in the present disclosure, it should be understood that the disclosed device may be implemented in other ways. For instance, the examples device described above are merely illustrative. For instance, division of the units is merely based on logical functions. In actual implementations, there may be other manners of division. For instance, a plurality of units or components may be combined or integrated into another system, or some characteristics may be omitted or not be performed. The above-mentioned examples merely describe several implementations of the disclosure. It should be understood that the description of the examples, while being relatively specific and detailed, are not given by way of limitation on the scope of the disclosure. It should be noted that, those skilled in the art may make changes and modifications without departing from the disclosure in its broader aspects, which all fall within the scope of protection of the disclosure. Therefore, the protection scope of the disclosure should be subject to the protection scope of the claims.

What is claimed is:

1. A processor, comprising:
    an instruction control unit configured to fetch a processing instruction;
    an operation module configured to receive frame information, neural network parameters, and the processing instruction, and perform neural network operations on the frame information and the neural network parameters according to the processing instructions; and
    a storage module configured to store the frame information and the neural network parameters,
    wherein the frame information includes complete frame information and reference frame information, and the neural network parameters include neurons, weights, topological structures and/or processing instructions, and
    wherein the operation module includes:
    an accurate operation unit configured to:
        fetch the complete frame information and weights in the neural network parameters,
        perform neural network operations to obtain a first operation result, and
        transfer the first operation result to the storage module, and
    an approximate operation unit configured to:
        fetch the reference frame information and an operation result of the reference frame which is obtained in advanced and stored in the storage module,
        perform approximate operations to obtain a second operation result, and transfer the second operation result to the storage module.

2. The processor of claim 1, wherein the accurate operation unit includes at least one of:
    a multiplier configured to perform the multiplication operations,
    one or more adders configured to perform the addition operations, or
    an activation function unit configured to perform the activation function operations.

3. The processor of claim 1,
    wherein the processor further includes a decoding module configured to decompress a compressed video, fetch frame information from each frame in the video, divide the frame information into complete frame information and reference frame information, and store the complete frame information and the reference frame information in the storage module,
    wherein the reference frame information includes reference frame information that refers to encoding of a previous frame and/or reference frame information that refers to encodings of a previous frame and a subsequent frame.

4. The processor of claim 3, wherein the decoding module is further configured to assign a flag bit to each piece of the frame information.

5. The processor of claim 4, wherein:
    for reference frame information that refers to encoding of a previous frame, the decoding module is further configured to mark the previous reference frame of the frame and/or displacement of the frame compared with the previous reference frame, and
    for reference frame information that refers to encodings of a previous frame and a subsequent frame, the decoding module is further configured to mark the previous reference frame and the subsequent reference frame of the frame and/or displacements of the frame compared with the previous reference frame and the subsequent reference frame.

6. The processor of claim 5, wherein the processor further includes:
    an encoding module that is connected to the instruction control unit and the operation module, and is configured to encode the processing instruction and transfer an encoded processing instruction to the operation module, wherein
    the operation module is configured to perform neural network operations on the frame information and the neural network parameters according to the encoded processing instruction.

7. A processing method comprising:
    fetching a processing instruction, by an instruction control unit, to control an operation module; and
    receiving, by the operation module, frame information, neural network parameters and the processing instruction, and performing neural network operations on the frame information and the neural network parameters according to the processing instruction;

wherein the frame information and the neural network parameters are stored in a storage module, wherein the frame information includes complete frame information and reference frame information, and the neural network parameters include neurons, weights, topological structures and/or processing instructions, and wherein the operation module includes an accurate operation unit and an approximate operation unit, and the receiving, by the operation module, the frame information, the neural network parameters and the processing instruction, and performing neural network operations on the frame information and the neural network parameters according to the processing instruction includes:

fetching, by the accurate operation unit, the complete frame information and weights in the neural network parameters, performing neural network operations to obtain a first operation result, and transferring the first operation result to the storage module, and fetching, by the approximate operation unit, the reference frame information and an operation result of the reference frame which is obtained in advanced and stored in the storage module, performing approximate operations to obtain a second operation result, and transferring the second operation result to the storage module.

8. The processing method of claim 7, wherein:
the neural network operations include multiplication operations, addition operations, activation function operations, and/or pooling operations.

9. The processing method of claim 8, wherein the accurate operation unit includes:
a multiplier configured to perform the multiplication operations, and/or
one or more adders configured to perform the addition operations, and/or
an activation function unit configured to perform the activation function operations.

10. The processing method of claim 7, wherein prior to the fetching a processing instruction by the instruction control unit to control the operation module, the method further includes:
decompressing, by a decoding module, a compressed video, fetching frame information from each frame in the video, dividing the frame information into complete frame information and reference frame information, and storing the complete frame information and the reference frame information in the storage module.

11. The processing method of claim 10, wherein the reference frame information includes reference frame information that refers to encoding of a previous frame and/or reference frame information that refers to encodings of a previous frame and a subsequent frame.

12. The processing method of claim 11, wherein the decoding module is further configured to assign a flag bit to each piece of the frame information.

13. The processing method of claim 12, wherein:
for the reference frame information that refers to encoding of a previous frame, the decoding module is further configured to mark the previous reference frame of the frame and/or displacement of the frame compared with the previous reference frame, and for the reference frame information that refers to encodings of a previous frame and a subsequent frame, the decoding module is further configured to mark the previous reference frame and the subsequent reference frame of the frame and/or displacements of the frame compared with the previous reference frame and the subsequent reference frame.

14. The processing method of claim 7, wherein between the fetching a processing instruction by the instruction control unit and the receiving the frame information, the neural network parameters, and the processing instruction by the operation module, the processing method further includes:
encoding, by an encoding module that is located between the instruction control unit and the operation module, the processing instruction, and transferring an encoded processing instruction to the operation module, and
performing, by the operation module, neural network operations on the frame information and the neural network parameters according to the encoded processing instruction.

15. An electronic device, comprising:
a processor that includes:
an instruction control unit configured to fetch a processing instruction;
an operation module configured to receive frame information, neural network parameters, and the processing instruction, and perform neural network operations on the frame information and the neural network parameters according to the processing instructions; and
a storage module configured to store the frame information and the neural network parameters,
wherein the frame information includes complete frame information and reference frame information, and the neural network parameters include neurons, weights, topological structures and/or processing instructions, and
wherein the operation module includes:
an accurate operation unit configured to:
  fetch the complete frame information and weights in the neural network parameters,
  perform neural network operations to obtain a first operation result, and
  transfer the first operation result to the storage module, and
an approximate operation unit configured to:
  fetch the reference frame information and an operation result of the reference frame which is obtained in advanced and stored in the storage module,
  perform approximate operations to obtain a second operation result, and transfer the second operation result to the storage module.

* * * * *